United States Patent
Rachow

(10) Patent No.: US 11,654,867 B2
(45) Date of Patent: May 23, 2023

(54) NOZZLE ASSEMBLY FOR CLEANING A VEHICLE SURFACE

(71) Applicant: A. Raymond et Cie, Grenoble (FR)

(72) Inventor: Larry M. Rachow, Lenox, MI (US)

(73) Assignee: A. RAYMOND ET CIE, Grenoble (FR)

( * ) Notice: Subject to any disclaimer, the term of this patent is extended or adjusted under 35 U.S.C. 154(b) by 151 days.

(21) Appl. No.: 17/106,896

(22) Filed: Nov. 30, 2020

(65) Prior Publication Data

US 2022/0169210 A1 Jun. 2, 2022

(51) Int. Cl.
*B60S 1/52* (2006.01)
*B05B 1/30* (2006.01)
*B05B 1/20* (2006.01)
*B05B 13/02* (2006.01)

(52) U.S. Cl.
CPC ............... *B60S 1/52* (2013.01); *B05B 1/202* (2013.01); *B05B 1/3093* (2013.01); *B05B 13/0278* (2013.01)

(58) Field of Classification Search
CPC .............. B05B 1/10; B05B 1/202–207; B05B 13/0278; B60S 1/52
USPC .......... 239/284.1, 284.2, 397, 550, 551, 600
See application file for complete search history.

(56) References Cited

U.S. PATENT DOCUMENTS

| | | | |
|---|---|---|---|
| 5,074,471 A * | 12/1991 | Baumgarten | B60S 1/522 239/602 |
| 6,113,006 A | 9/2000 | Walker et al. | |
| 6,199,773 B1 | 3/2001 | Holt et al. | |
| 7,014,131 B2 | 3/2006 | Berning et al. | |
| 10,486,654 B2 * | 11/2019 | Ostergren | B05B 1/24 |
| 2002/0092928 A1 * | 7/2002 | Conroy | B05B 1/1654 239/391 |
| 2010/0090036 A1 * | 4/2010 | Allen | B05B 1/08 239/589.1 |
| 2011/0079661 A1 * | 4/2011 | Barton | B05B 15/74 239/600 |
| 2016/0318486 A1 * | 11/2016 | Weitzel | B60S 1/52 |
| 2019/0061698 A1 | 2/2019 | Mizuno et al. | |
| 2020/0061643 A1 | 2/2020 | Rachow | |

FOREIGN PATENT DOCUMENTS

| | | | |
|---|---|---|---|
| DE | 102010007850 A1 | 9/2010 | |
| DE | 102012004815 A1 | 9/2013 | |
| EP | 3300971 A1 | 4/2018 | |
| GB | 2350284 A * | 11/2000 | B60S 1/52 |
| WO | 9704875 A1 | 2/1997 | |
| WO | 20150157744 A1 | 10/2015 | |

* cited by examiner

*Primary Examiner* — Cody J Lieuwen
(74) *Attorney, Agent, or Firm* — Warner Norcross + Judd LLP

(57) ABSTRACT

The present disclosure provides a nozzle assembly including a unitary nozzle body having multiple flow channels therein. Spray nozzles are mounted to outlet ports of the flow channels, such as via a snap-fit connection. The spray nozzles can be keyed with the outlet ports to align them in a predetermined position and lock the spray nozzles and the nozzle body together radially. Vehicles and systems incorporating a nozzle assembly are also provided.

10 Claims, 5 Drawing Sheets

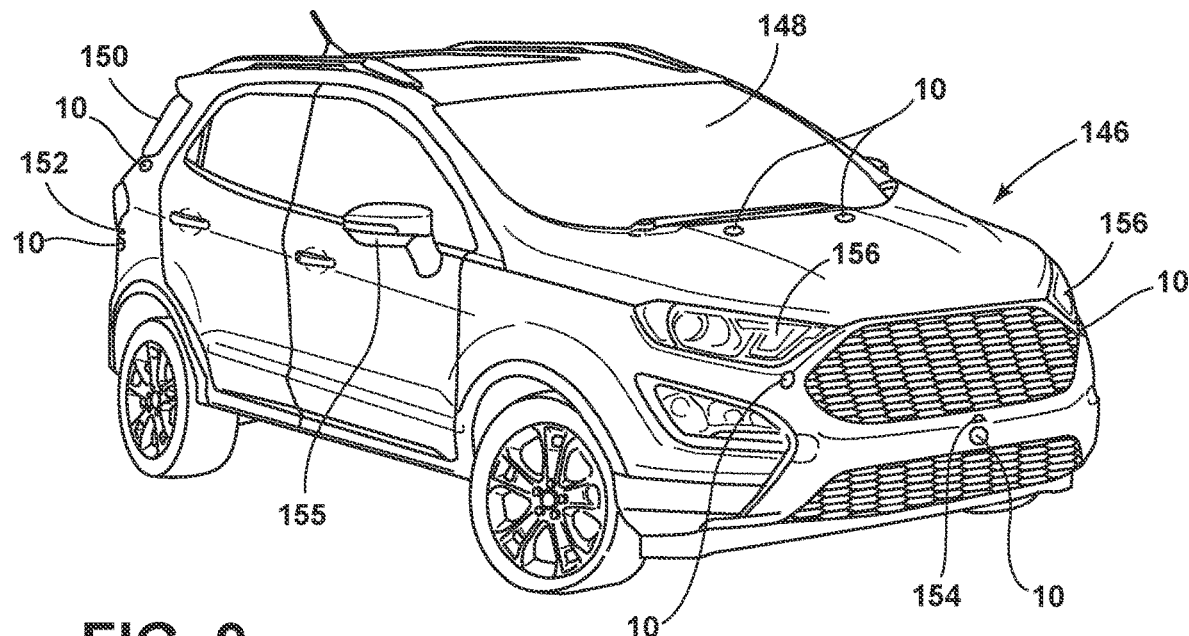
FIG. 9
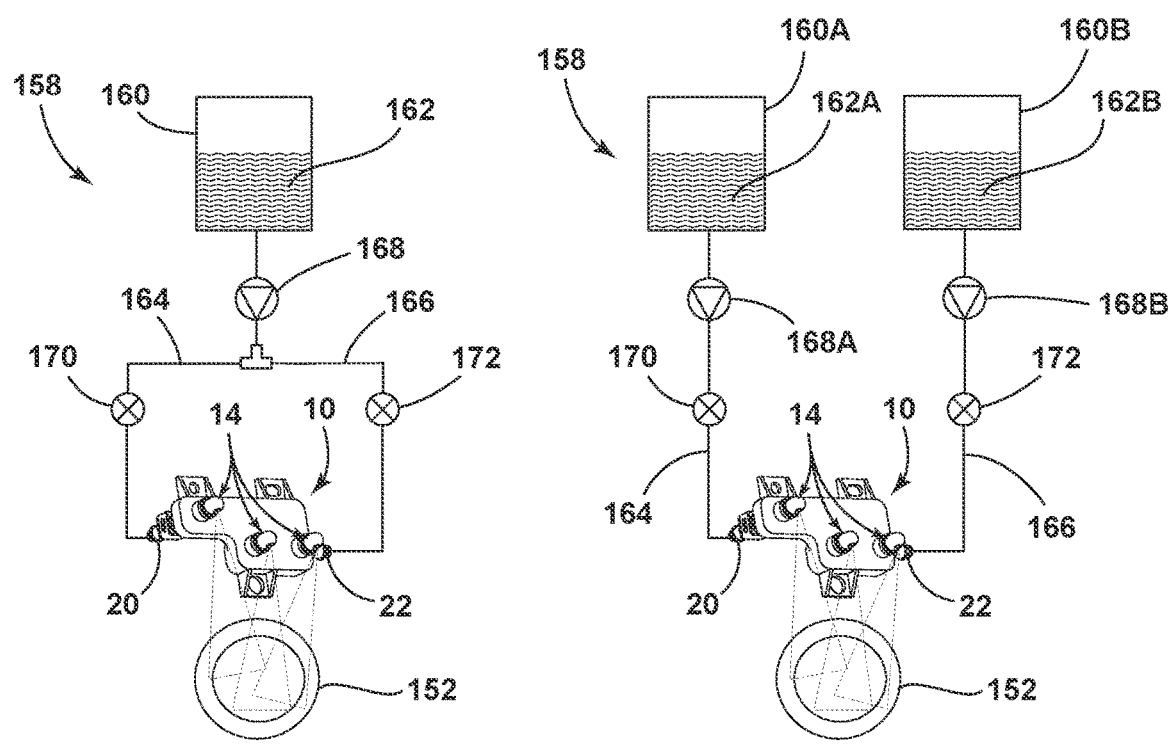
FIG. 10
FIG. 11

NOZZLE ASSEMBLY FOR CLEANING A VEHICLE SURFACE

FIELD OF THE INVENTION

The present disclosure generally relates to vehicle cleaning systems and devices, and, more specifically, to nozzles for cleaning a surface, such as a vehicle camera, sensor, or other surface.

DESCRIPTION OF THE RELATED ART

Various cleaning devices for vehicles are known, including nozzles that clean windows, headlights, and other vehicle surfaces. Exterior cameras and driver assistance sensors are increasing in popularity, and many vehicle models have these as standard or optional equipment. Due to the impact of environmental elements to these cameras and sensors, these systems can experience a loss in effectiveness. Said nozzles can be used to clean the lenses of these systems. Self-driving or autonomous vehicles require an even greater number of cameras and sensors for navigation and guidance, driving and safety, and internal performance.

In order to optimize the cleaning process, conventional washer nozzles are typically uniquely arranged on each different type of vehicle, and with respect to each structure to be cleaned, in order to properly direct fluid spray onto a particular region of a surface. Such unique arrangements have led to many developments in installation and post-installation solutions to accommodate the various brand, model, and/or structure-specific mounting options.

Unfortunately, however, conventional washer nozzles and related cleaning devices suffer from numerous drawbacks, including a requisite increase in manufacturing costs and labor, system weight, and number of individualized components needed (e.g. for new models/designs) associated with the solutions outlined above. These drawbacks are especially limiting with respect to cleaning systems for sensors, particularly those associated with self-driving and/or autonomous vehicular systems, which often require more effective cleaning due to the impact of environmental elements to systems that can lose effectiveness and, if uncorrected, lead to impairment of normal system function and/or vehicle operation. In newer vehicle designs requiring a greater number of cameras and sensors, such as for self-driving or autonomous vehicles, space and weight constraints make conventional nozzle designs undesirable and impractical.

BRIEF SUMMARY

According to one embodiment, a nozzle assembly for a vehicle washing system is provided. The nozzle assembly includes a unitary nozzle body comprising multiple flow channels, with spray nozzles mounted to outlet ports of the flow channels.

In these and other embodiments, the unitary nozzle body includes a plurality of inlet ports, a plurality of outlet ports, and a plurality of flow channels therein that are fluidly isolated from each other, the plurality of flow channels each comprising one of the plurality of inlet ports and at least one of the plurality of outlet ports.

In these and other embodiments, the spray nozzles are snap-fit to the outlet port. The snap-fit connection can include a snap-lock receiver on the spray nozzle or outlet port, and a snap-lock element on the other, the snap-lock element being engageable with the snap-lock receiver to retain the spray nozzle in a mounted position on the nozzle body.

In these and other embodiments, the spray nozzles have a nozzle housing including a stem received within one of the outlet ports, and a head projecting outwardly from the nozzle body, the head having a nozzle outlet through which cleaning media is sprayed. A flow passage extends through the stem and the head of nozzle housing.

In these and other embodiments, the flow channels can extend along different, non-parallel axes. A spray nozzle can spray cleaning media in a direction that is generally oblique to the axis of the flow channel that supplies cleaning media to the spray nozzle.

In these and other embodiments, the supply and outlet port for one of the flow channels may be collinear or perpendicular.

In these and other embodiments, the spray nozzles are keyed to the outlet port. The keyed connection can include a keyway on the outlet port or spray nozzle, and a key on the other, where the key is receivable in the keyway to align the spray nozzle in a predetermined position on the outlet port, and lock the spray nozzle and the nozzle body together radially.

In these and other embodiments, the spray nozzles have a flange configured to seat against a rim of the outlet port, with a proximal surface of the flange in flush engagement with the rim.

In these and other embodiments, the spray nozzles can have different structures and produce different spray patterns. According to another embodiment, a nozzle assembly for a vehicle washing system includes a unitary nozzle body, a first spray nozzle, and second spray nozzle. The unitary body has a first flow channel therein, the first flow channel having a first supply port receiving cleaning media and a first outlet port, and a second flow channel therein that is fluidly isolated from the first flow channel, the second flow channel having a second supply port receiving cleaning media and a second outlet port. The first spray nozzle is snap-fit to the first outlet port and the second spray nozzle is snap-fit to the second outlet port. The spray nozzles can each comprise a nozzle housing having a stem comprising a snap-fit component and a head projecting outwardly from the nozzle body, the head comprising a nozzle outlet through which cleaning media is sprayed, and a flow passage extending through the stem and the head of nozzle housing.

As described further below, embodiments of the nozzle assembly disclosed herein provide a compact, serviceable, and/or customizable cleaning device. Embodiments of the nozzle assembly, vehicle, and other systems disclosed herein provide for an improved cleaning of surfaces, such as cameras, sensors, headlights or headlamps, windshields, windows, side mirrors, other vehicle surfaces, or other non-vehicle surfaces.

These and other features and advantages of the present disclosure will become apparent from the following description of particular embodiments, when viewed in accordance with the accompanying drawings and appended claims.

DESCRIPTION OF THE DRAWINGS

In the drawings:

FIG. 9 is a schematic view of a vehicle comprising a nozzle assembly in accordance with the disclosed inventive concept;

FIG. 10 is a schematic view of a fluid spray system comprising a nozzle assembly in accordance with the disclosed inventive concept; and FIG. 11 is a schematic view of another embodiment of a fluid spray system comprising a nozzle assembly in accordance with the disclosed inventive concept.

DETAILED DESCRIPTION OF THE INVENTION

Figure 1:
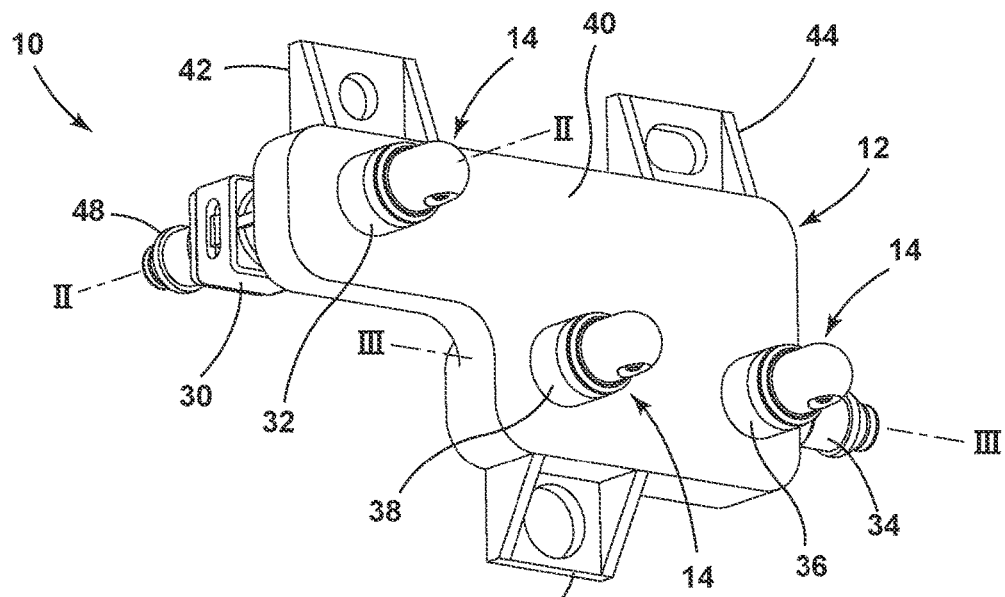
FIG. 1 is a front perspective view of a nozzle assembly according to a first embodiment of the disclosed inventive concept.

A nozzle assembly provided for cleaning a vehicle surface is described below. As will be appreciated from the description here, the nozzle assembly has multiple applications, but is generally used as a cleaning device for vehicle surfaces, such as cameras, sensors, headlights, or headlamps of vehicles. It is to be understood that the nozzle assembly may be used to clean other surfaces, such as a headlight or headlamp, windshield, window, other vehicle surfaces, or other surfaces in non-automotive applications. At least some embodiments of the nozzle assembly disclosed herein functions to provide a compact, serviceable, and/or customizable cleaning device. This can be accomplished through the various elements thereof, as described below, including a nozzle body that mounts multiple spray nozzles, for example via a snap-fit mounting. To provide a compact cleaning device that takes up minimal space within the vehicle, in some embodiments a check valve can be integrated with the nozzle body to control the flow of cleaning media to one or more spray nozzles. To provide a flexible and customizable cleaning device that is easily adapted to provide different spray patterns to optimally clean a given surface, in some embodiments that nozzle body comprises outlets have a universal mounting that can interchangeably receive different spray nozzles. Moreover, the unique design and material construction of the nozzle assembly allows for increased serviceability, ease of manufacturing, increased cleaning efficacy, reduced number of parts, as well as other benefits that will be readily apparent to those of skill in the art in view of the embodiments shown and described herein.

In the following figures, the same reference numerals will be used to refer to the same components. In the following description, various operating parameters and components are described for different constructed embodiments. These specific parameters and components are included as examples and are not meant to be limiting.

Figure 2:
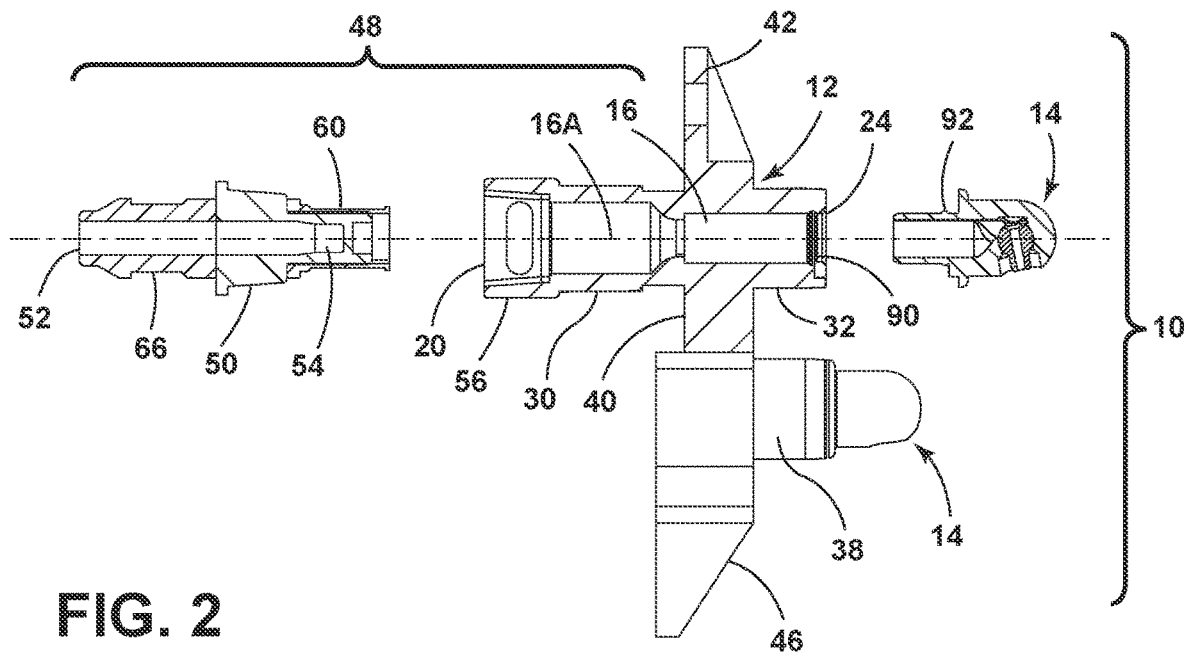
FIG. 2 is a partially exploded, cross-section view of the nozzle assembly taken along line II-II in FIG. 1.
Figure 3:
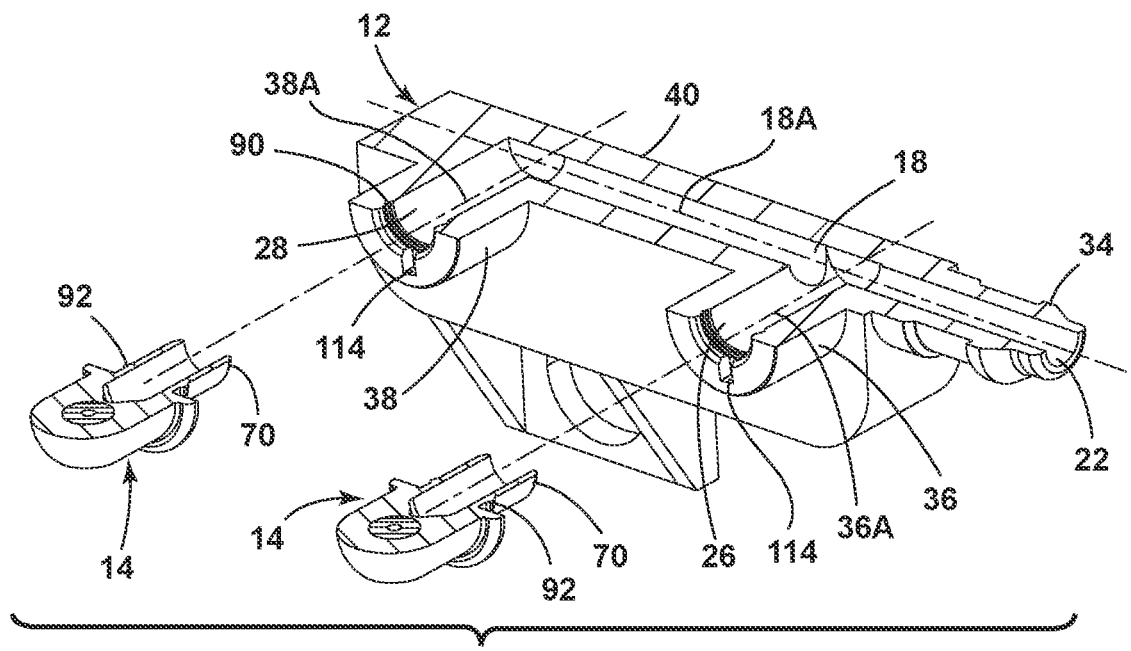
FIG. 3 is a partially exploded, cross-section view of the nozzle assembly taken along line III-III in FIG. 1.

In accordance with the disclosed inventive concept and with reference to FIGS. 1-3 of the drawings, there is provided a nozzle assembly 10 including a nozzle body 12 and multiple spray nozzles 14. The nozzle body 12 includes a plurality of flow channels 16, 18 therein. Cleaning media is supplied to the spray nozzles 14 via the flow channels 16, 18, with each spray nozzle 14 fluidly coupleable to one of the flow channels 16, 18.

The flow channels 16, 18 are fluidly isolated from each other, such that cleaning media supplied to one flow channel does not intermingle or mix with cleaning media supplied to another flow channel. Each flow channel 16, 18 can be fluidly connected with a source of cleaning media, such as a pressurized source of cleaning media, as described in further detail below. The flow channels 16, 18 can be fluidly connected to a common source of cleaning media, or separate sources of cleaning media.

Each flow channel 16, 18 includes at least one cleaning media inlet 20, 22, which can define a inlet of the nozzle body 12 and at least one cleaning media outlet 24, 26 28, which can define an outlet of the nozzle body 12. Each flow channel 16, 18 defines a cleaning media flow pathway extending through the nozzle body 12, from the inlet 20, 22 to the outlet 24, 26, 28.

In the embodiment shown, the nozzle body 12 includes two flow channels, a first flow channel 16 and a second flow channel 18. Other numbers of flow channels for the nozzle body 12 are possible. For example, in other embodiments, the nozzle body 12 may include more than two flow channels.

The first flow channel 16 includes a supply port 30 defining the flow channel inlet 20 and an outlet port 32 defining the flow channel outlet 24. The second flow channel 18 includes a separate supply port 34 defining the flow channel inlet 22 and a multiple outlet ports 36, 38 defining multiple flow channel outlets 26, 28 for the second flow channel 18. As such, the second flow channel 18 can comprise a manifold. Other numbers of outlets for each flow channel 16, 18 are possible. In other embodiments, the flow channels 16, 18 may include one, two, or more than two outlets.

The nozzle body 12 can be a unitary body, i.e. a module or unit, for easy installation and servicing. In some embodiments, the unitary nozzle body 12 is a one-piece molded or formed article. For example, the nozzle body 12 can be a one-piece body made of a plastic material, and may be manufactured, for example, via injection molding, additive manufacturing, or 3-D printing. In one example, the nozzle body 12 is a plastic injection molded structure. In another example, the nozzle body 12 is a structure having multiple layers of plastic material deposited by an additive manufacturing or 3-D printing machine. In other embodiments, the unitary nozzle body 12 can be a multi-piece body forming a module or unit. It is to be appreciated that other materials and manufacturing methods for the nozzle body 12 are possible, including a metal body manufactured by stamping, casting, etc.

The nozzle body 12 can include a central body 40, with the supply and outlet ports 30-38 extending from the central body 40. In embodiments where the unitary nozzle body 12 is a one-piece molded article, the supply ports and outlet ports 30-38 can be integrally formed with the central body 40. In the embodiment shown, the supply ports 30, 34 project from different faces of the central body 40, and the outlet ports 32, 36, 38 project from the same face, e.g. a common planar face, of the central body 40. Other spatial relationships for the ports 30-28 on the central body 40 are possible.

The nozzle body 12 can have a structure for coupling the nozzle assembly 10 to a supporting structure, such as a supporting structure of a vehicle, to position the nozzle assembly 10 adjacent to a target surface to be cleaned. To install the nozzle assembly 10 on a vehicle, the nozzle assembly 10 can be provided with at least one retention point for retaining the nozzle assembly 10 on the vehicle. In the embodiment shown, multiple retention points 42, 44, 46 are provided, and can comprise brackets extending from the nozzle body 12 for a multi-point installation. The brackets are connectable to a supporting structure of the vehicle, such as on a chassis or frame of the vehicle. Alternatively to brackets, the nozzle body 12 can be provided with a mounting clip or other attachment features for installation on a vehicle.

Various connection means can aid in connecting the nozzle assembly 10 with the supporting structure at each retention point 42, 44, 46. Suitable connection means include fasteners (e.g. threaded fasteners such as bolts, screws, etc., push fasteners, clamp fasteners, etc.) connectors (e.g. quick connectors, threaded connectors/connections, snap-fit connectors, etc.), couplings (e.g. snap-fit couplings, male-female couplings, press-fit couplings, etc.) clamps, adhesives, and the like, as well as various combinations thereof. The retention point and connection means can be configured to fixedly or adjustably mount the nozzle assembly 10 on the supporting structure.

The nozzle assembly 10 can be mounted in various locations on the vehicle 10. For example, the nozzle assembly 10 can be hood mounted, under hood mounted, cowl screen mounted, or wiper arm mounted. In another example, the nozzle assembly 10 can be integrated in or mounted on a rear end spoiler or a center high-mounted stop lamp (CHMSL). Portions of the nozzle assembly 10 can be flush with, or otherwise form a contiguous or continuous surface with, the vehicle 10. For example, portions of the nozzle assembly 10 can be exposed and define a Class A surface of the vehicle.

The nozzle assembly 10 can be a modular assembly for easy installation and servicing. With the unitary nozzle body 12, multiple spray nozzles 14 can be simultaneously installed on a vehicle. Such installation can be completed by making necessary mechanical and fluid connections. Another advantage of the nozzle assembly 10 is that the use of one nozzle body 12 to mount multiple spray nozzles 14 can conserve space, reduce weight, and decrease assembly time.

Referring to FIG. 2, the first flow channel 16 can extend axially along a first channel axis 16A. The supply port 30 defining the flow channel inlet 20 and the outlet port 32 defining the flow channel outlet 24 can also share a common axis with the flow channel 16. In other embodiments, one or more of supply port 30 and outlet port 32 can have an axis that is non-coaxial with the channel axis 16A.

A check valve 48 can control the flow of cleaning media through the nozzle body 12. In one embodiment, the check valve 48 is configured for unidirectional flow into or through the first flow channel 16 (e.g. in one direction from the inlet 20 to the outlet 22. To keep the nozzle assembly 10 small and compact, the check valve 48 can be integrated with the nozzle body 12, or otherwise connected thereto by a fluid hose or conduit (not shown).

In certain embodiments, the check valve 48 comprises an elastically deformable sleeve configured to be disposed about a valve stem, with the sleeve acting as a gate to interfere with passage of fluid through the flow channel 16 by movement into or out of a valve seat. One example of a check valve with an elastically deformable sleeve is described below with respect to FIG. 4. It is to be appreciated that other styles/configurations of check valves are possible, including, but not limited to, a ball check valve, a diaphragm check valve, a duckbill check valve, a swing check valve, a lift-check valve, an umbrella check valve, etc.

Figure 4:
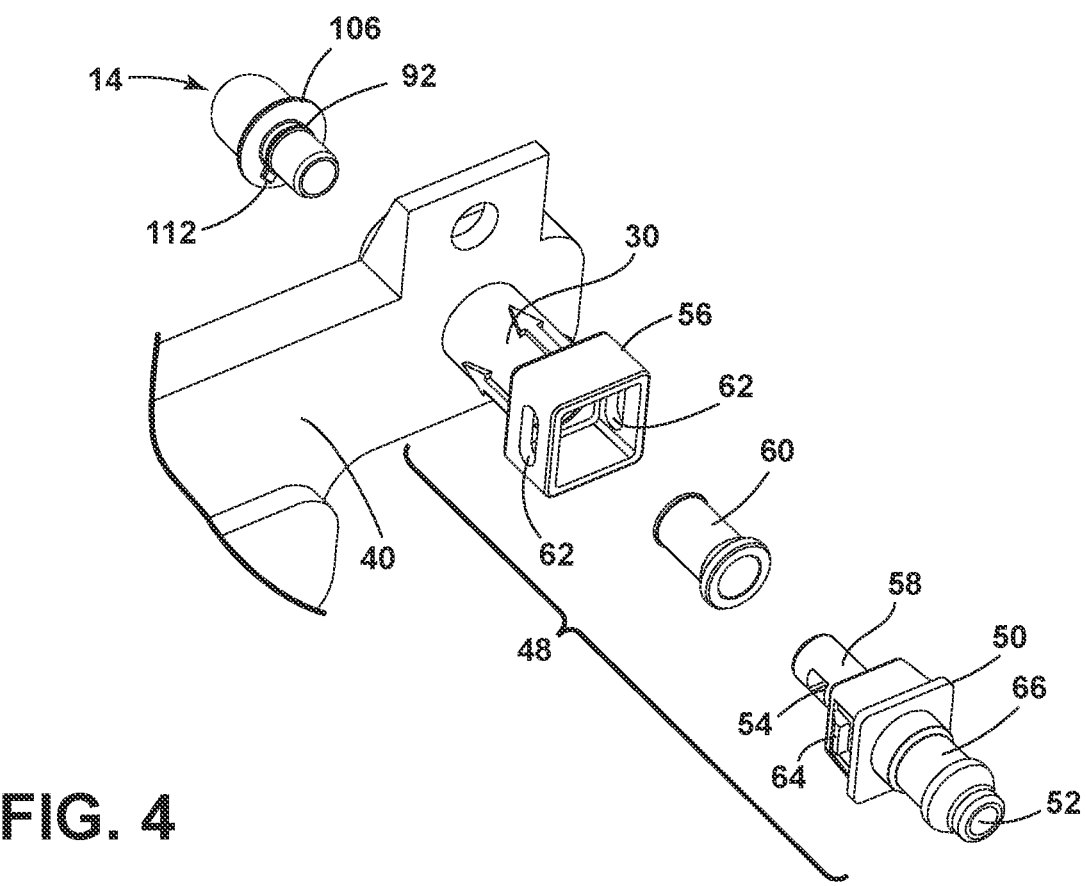
FIG. 4 is a partially exploded, rear perspective view showing a check valve of the nozzle assembly of FIG. 1.

Referring to FIG. 4, the check valve 48 provides unidirectional flow of fluid through the flow channel 16, i.e., preventing backflow. In the present embodiment, the check valve 48 comprises a valve body 50 having a valve inlet 52 and at least one valve outlet or orifice 54. A fluid passage formed in the valve body 50 provides a pathway for cleaning media from the inlet 52 to the orifice 54. The valve body 50 can have any shape and be provided in any form, including, but not limited to, an elongated tubular shape as illustrated.

The nozzle body 12 includes a valve housing 56 that can receive the valve body 50 and help direct fluid from the orifice 54 to the flow channel outlet 22. In the illustrated embodiment, the valve housing 56 can be integrated with the supply port 30. Other configurations for the integrated valve housing 56 are possible, including configurations in which the valve housing 56 is integrated with the central body 40 and not integrated with the supply port 30.

The valve body 50 include a valve stem 58 having the at least one orifice 54 and configured to project into the valve housing portion of the supply port 30. While only one orifice 54 is visible in FIG. 4, the valve stem 58 can, for example, comprise two diametrically opposed orifices 54. An elastically deformable sleeve 60 is configured to be disposed about the valve stem 58 to selectively seal the orifices 54, with the sleeve 60 acting as a gate to interfere with passage of fluid through the flow channel 16 by movement into or out of a valve seat to seal or unseal the orifices 54. When unsealed, cleaning media flows from the orifices 54 through the flow channel 16.

The valve body 50 carrying the sleeve 60 is inserted into the valve housing 56 to establish a mounted position of these components of the check valve 48 on the nozzle body 12. Various connection means can aid in connecting the valve body 50 with the valve housing 56. The valve body 50 and valve housing 56 can be attached together by using any suitable mechanical coupling or other interlock, such as a snap fit coupling or quick-connect coupling. As shown, a snap-lock receiver 62 can be provided on the valve housing 56 and a snap-lock element 64, such as a snap-lock detent, can be provided at any suitable location on the valve body 50. The snap-lock element 64 is engageable with the snap-lock receiver 62 to retain the valve body 50, and the mounted sleeve 62, in the mounted position on the nozzle body 12. Other attachment structures are possible.

The valve body 50 can include a tubular inlet conduit 66 defining the valve inlet 52, and configured to extend outwardly from the valve housing 56 to interconnect the check valve 48 with a source of cleaning media. The inlet conduit 66 have an exterior barb or other structure to receive and retain thereon a hose, duct, tubing, or other conduit (not shown) in fluid communication with the source of cleaning media. In another embodiment, a valve is not integrated with the first supply port 30, and the first supply port 30 can be directly connected with the hose, duct, tubing, or other conduit in fluid communication with the source of cleaning media.

Referring to FIG. 3, the second flow channel 18 is fluidly connectable with a source of cleaning media via the supply port 34. The supply port 34 can have an exterior barb or other structure to receive and retain thereon a hose, duct, tubing, or other conduit in fluid communication with the source of cleaning media. In the embodiment shown, a check valve for the second flow channel 18 is not integrated with the nozzle assembly 10. In other embodiments, a check valve can be provided for the second flow channel 18, and can be integrated with, directly mounted or attached to, or otherwise in fluid communication with the second supply port 34.

The second flow channel 18 can extend axially along a second channel axis 18A. The supply port 34 defining the flow channel inlet 22 can also share a common axis with the flow channel 18. In other embodiments, the supply port 30 can have an axis that is non-coaxial with the channel axis 18A.

At least one of the outlet ports 36, 38 defining flow channel outlets 26, 28 can extend along a respective outlet axis 36A, 38A that is not coaxial with the channel axis 18A. As shown in FIG. 3, the outlet axes 36, 38A are perpendicular to the channel axis 18A. In other embodiments, the outlet axes 36, 38A can be oblique to the channel axis 18A. The outlet axes 36A, 38A in the embodiment shown in FIG. 3 are also parallel to each other, though it is understood that in other embodiments, the outlet axes 36A, 38A may be non-parallel to each other.

The first and second channel axes 16A, 18A can be non-parallel to each other. In the embodiment shown herein, the axes 16A, 18A are perpendicular to each other. In other embodiments, the second channel axis 18A can be oblique to the first channel axis 16A. The flow channels 16, 18 can be offset from each other to stagger the channels 16, 18 extending through the nozzle body 12.

Figure 5:
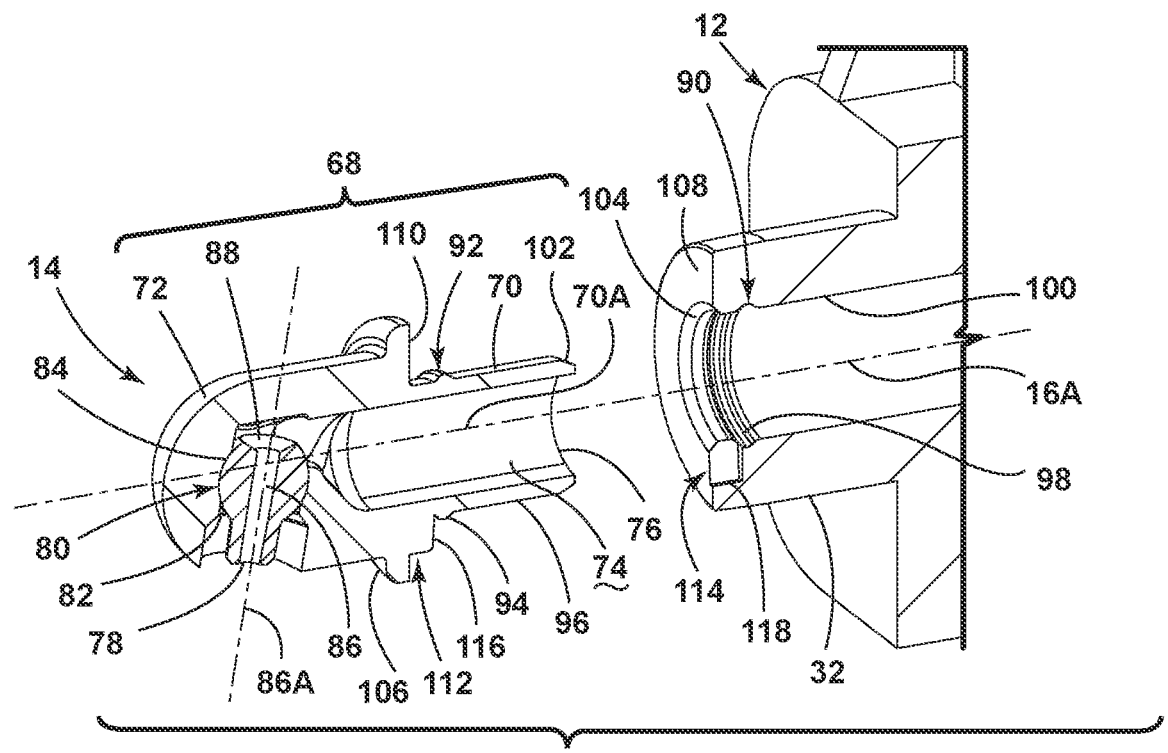
FIG. 5 is a close-up, sectional view showing one embodiment of a spray nozzle disassembled from a nozzle body of the nozzle assembly of FIG. 1.

FIG. 5 is a close-up, sectional view showing one of the spray nozzles 14 disassembled from the nozzle body 12, e.g. disconnected from the outlet port 32. For brevity, the spray nozzle 14 associated with outlet port 32 is described herein. It is understood that the other spray nozzles may be similar or identical in structure, or the other spray nozzle may have different structures. In the embodiment of the nozzle assembly 10 shown in FIGS. 1-6, the spray nozzles 14 are substantially identical in structure.

The spray nozzle 14 includes a nozzle housing 68 having a stem 70 and a head 72. A flow passage 74 extends through the stem 70 and the head 72, from a nozzle inlet 76 at the stem 70 to a nozzle outlet 78 at the head. The nozzle outlet 78 comprises an exit orifice through which cleaning media is sprayed. The stem 70 is receivable within one of the outlet ports 32, 36, 38 of the nozzle body 12. When installed, the head 72 can project outwardly from the nozzle body 12.

In the embodiment shown, the spray nozzle 14 is configured to produce a jet spray pattern. A spray-building element, such as a jet insert 80 (sometimes referred to as an eyeball), can be inserted into the nozzle housing 68 and can define the outlet 78 configured to produce the jet spray pattern. The head 72 can have an accommodation space 82, and the jet insert 80 can include a spherical body 84 inserted into the accommodation space 82. The spherical body 84 has a through bore 86 extending therethrough along a bore axis 86A, with the outlet 78 at a distal or outward end of the bore 86. A proximal or inward end of the bore includes an entry opening 88 of the spherical body 84, the entry opening 88 being open to the flow passage 74. In another alternative embodiment, instead of being defined by a jet insert, the outlet 78 can be molded, cut, or otherwise formed in the head 72 and modified to allow the head 72 to produce the required spray pattern.

The jet insert 80 can be fixed within the nozzle head 72 to direct the jet spray pattern in a predetermined orientation, or can be adjustably mounted in the head 72 to adjust the orientation of the jet spray. For example, the jet insert 80 can be rotationally mounted within the head 72 via the spherical body 84, and rotating the spherical body 84 within the accommodation space 82 permits the orientation of the jet spray to be adjusted.

Other configurations for the spray nozzle 14 are possible. The outlet 78 can be any type of cleaning media outlet, suitable for the purposes described herein, including the spraying or dispensing of cleaning media to a vehicle surface. The outlet 78 can be configured to produce various spray patterns, i.e. a static fan spray, a static jet spray, etc. Other spray-building elements, such as a chip or eyeball, can be provided at the outlet 78 for achieving other spray patterns, such as a jet spray, an oscillating fan spray or a combination jet and fan spray. Alternatively, instead of producing a spray of cleaning media, the outlet 78 can dispense a stream of cleaning media, or otherwise disburse cleaning media toward the vehicle surface to be cleaned.

The stem 70 can extend along a stem axis 70A. For the outlet port 32, the stem axis 70A can be generally coaxial with the flow channel axis 16A, as well as sharing a common axis with the outlet port 32. As such, the stem 70 is inserted into the outlet port 32 along the flow channel axis 16A. For the other outlet ports 36, 38 (FIG. 3), the stem axis 70A can be coaxial with the outlet axes 36A, 38A and perpendicular to the flow channel axis 18A. As such, the stems 70 are inserted into the outlet ports 36, 38 transverse to the flow channel axis 18A.

The outlet 78 can be configured to direct a spray of cleaning media generally along the axis 86A of the bore 86. The bore axis 86A can be generally oblique with respect to the stem axis 70A. As such, the outlet 78 is configured to direct a spray of cleaning media obliquely to the stem axis 70A. To accomplish this, the accommodation space 82 of the head 72 can extend generally obliquely to the stem axis 70A.

In embodiments where the jet insert 80 is adjustably mounted within the head 72, the bore axis 86A is adjustable with respect to the stem axis 70A. In other embodiments, the bore axis 86A can be generally radial with respect to the stem axis 70A, with the outlet 78 configured to direct a spray of cleaning media radially to the stem axis 70A. In yet other embodiments, the outlet 78 can be otherwise configured to direct a spray of cleaning media generally axially along the stem axis 70A, generally tangentially relative to the stem axis 70A, at an angle between the radial, axial, and/or tangential directions, or in multiple directions relative to the stem axis 70A.

The spray nozzles 14 can be snap-fit to the outlet ports 32, 36, 38 of the nozzle body 12. The stem 70 and outlet ports 32, 36, 38 can have snap-fit parts which are pushed together to interlock the spray nozzle 14 to the nozzle body 12. Providing the snap-fit parts as integral attachment features on the spray nozzle 14 and nozzle body 12 provides rapid assembly, without the need for tools, and avoids loose parts as found with assembly methods using separate screws or fasteners. Where the nozzle body 12 and spray nozzle 14 are plastic, the snap-fit parts can be integrally formed therewith.

The snap-fit joint can include a snap-lock receiver 90 provided on one of the spray nozzle 14 and the nozzle body 12, and a snap-lock element 92 provided on the other one of the spray nozzle 14 and the nozzle body 12, the snap-lock element 92 engageable with the snap-lock receiver 90 to retain the spray nozzle 14 in a mounted position on the nozzle body 12.

In the embodiment shown in FIG. 5, the nozzle body 12 comprises the snap-lock receiver 90 and the spray nozzle 14 comprises the snap-lock element 92. The snap fit is achieved by the snap-lock element 92 on the stem 70 forming a snap-lock when received in the snap-lock receiver 90 in the outlet port 32. The stem 70 is thus also received within the outlet port 32 of the nozzle body 12. For brevity, the snap-fit between the spray nozzle 14 and first outlet port 32 is described herein. It is understood that similar or identical snap-fits can attach the other spray nozzles 14 to the other outlet ports 36, 38.

The snap-lock element 92 can be a bead 94 on an outer surface 96 of the stem 70. The bead 94 can extend around a periphery of the stem 70, and can be generally annular to extend around a substantial portion, or the entire outer circumference of, the stem 70. In other embodiments, the snap-lock element 92 can include at least one, and optionally multiple, stud, lug, lip, protrusion, or other snap-fit part on the stem 70.

The snap-lock receiver 90 can be a groove 98 in an inner surface 100 of the outlet port 32 that at least partially receives the bead 94. The groove 98 can extend around the inner surface 100 of the outlet port 32, and can be generally annular to extend around a substantial portion, or the entire inner circumference of, the outlet port 32. In other embodiments, the snap-lock receiver 90 can include at least one, and optionally multiple, depression, undercut, or other snap-fit part on the outlet port 32.

To assemble the nozzle 14 with the nozzle body 12, the snap-lock element 92 on the stem 70 is snap fit with the snap-lock receiver 90 on the outlet port 32. For ease of insertion, the stem 70 can have a tapered end 102 and the outlet port 32 can have a flared inlet edge 104.

With an annular snap-fit, hoop-strain holds the spray nozzle 14 in place on the nozzle body 12. In certain embodiments, the stem 70 of the spray nozzle 14 is more elastic that the outlet port 32, and the stem 70 is elastically deformed briefly as it is pushed into the outlet port 32. The circumference of the stem 70 expands once in place, e.g. once the bead 94 catches in the groove 98, to return, or nearly return, to its original, undeformed state. In other embodiments, the outlet port 32 may be more elastic than the stem 70, and the circumference of the outlet port 32 can expand as the more rigid stem 70 is pushed in. In either case, once assembled, the stem 70 and outlet port 32 are not under load, or not under substantial load, providing an assembly with long-lasting strength. Upon successful assembly, tactile or audile feedback in the form of a "snap" is produced.

While an annular (cylindrical) snap-fit joint is shown in the figures, it is to be appreciated that other snap-fit connectors, snap-fit couplings, etc. providing snap-fit connections other than the one described are possible, including a cantilever or torsional snap-fits. The shape, size, and location of the snap-fit connecting structures of the spray nozzle 14 and nozzle body 12 may be varied.

Regardless of the type of snap-fit, in certain embodiments, once the spray nozzle 14 is snapped into place, it is not removable without damage to the nozzle 14 or nozzle body 12. Such a permanent or inseparable snap-lock arrangement is provided in the embodiment shown in FIGS. 1-6. Alternatively, a serviceable snap-lock arrangement (not shown) can be used whereby the spray nozzle 14 is detachable from the nozzle body 12, through the required pull-out force may be much larger than the snap-in force. For example, the snap-lock receiver 90 and/or the snap-lock element 92 can be shaped to allow disconnection of the spray nozzle 14 from the nozzle body 12, such as by providing the bead 94 and the groove 98 with return angles of less than 90°. This kind of snap-fit can be used multiple times. Generally, it can be advantageous having a removable snap-fit spray nozzle 14 with a snap-fit connection with the nozzle body 12, as this allows for the nozzle 14 to be removed for servicing or to exchange one nozzle for another on the same nozzle body 12.

Figure 6:
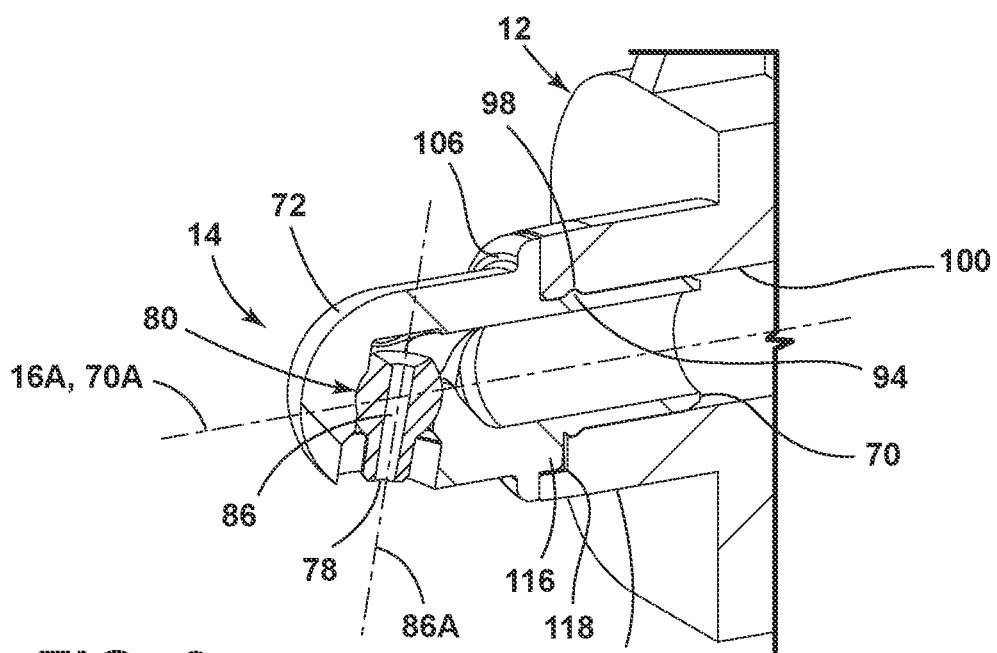
FIG. 6 is a view similar to FIG. 5, showing the spray nozzle assembled with the nozzle body.

The base or proximal end of the nozzle head 72 can include a flange 106 which seats against a flat exterior rim 108 of the outlet port 32 when the nozzle 14 is assembled with the nozzle body 12, e.g. when the stem 70 is fully installed in the outlet port 32, and prevents over-insertion of the nozzle 14 into the nozzle body 12. The flange 106 can be an annular flange extending around a portion of or all of the circumference of the nozzle head 72, and can have a larger diameter than the stem 70. A proximal surface 110 of the flange 106 is in flush engagement with the rim 108 when the nozzle 14 is installed, for example as shown in FIG. 6. The flange 106 can have substantially the same diameter as the rim 108 as shown, or can have a larger or smaller diameter in other embodiments of the nozzle assembly. In yet other embodiments, instead of a flange on the nozzle head 72, the flange can be eliminated, and a proximal face of the nozzle head 72 can seat against the rim 108 of the outlet port 32.

While not shown herein, a sealing element can be provided at the interface between components of the nozzle assembly 10, such as between the outlet port 32 and the stem 70 of the nozzle 14, to prevent leakage of cleaning media at the interface(s). A sealing element may be provided, for example, with a nozzle assembly 10 having large diameter outlet ports/spray nozzles or non-circular outlet ports/spray nozzles.

The spray nozzle 14 can be keyed to the nozzle body 12 such that the spray nozzle 14 can be mounted to the nozzle body 12 in a predetermined axial alignment. The predetermined axial alignment can be one that that results the spray nozzle 14 being oriented to spray cleaning media in a desired spray direction from the outlet 78. The stem 70 and outlet port 32 can have keyed components that must be aligned for the spray nozzle 14 to be fully installed on the nozzle body 12. The spray nozzle 14 is prevented from being fully inserted into the outlet port 32 with the keyed components misaligned. Accordingly, the snap-fit cannot engage until the keyed components are aligned. In addition to assuring a predetermined spray direction from the spray nozzle 14, the keyed components can provide an anti-rotation feature, whereby the spray nozzle 14 is radially locked with the outlet port 32.

The keyed components can include a key 112 provided on one of the spray nozzle 14 and the nozzle body 12, and a keyway 114 provided on the other one of the spray nozzle 14 and the nozzle body 12, the key 112 receivable in the keyway 114 to align the spray nozzle 14 in a predetermined position on the nozzle body 12. The key 112 can fit snugly in the keyway 114 to lock the nozzle 14 and nozzle body 12 together radially. In the embodiment shown in the figures, the spray nozzle 14 comprises the key 112 and the nozzle body 12 comprises the keyway 114. For brevity, the keyed coupling between the spray nozzle 14 and first outlet port 32 is described herein. It is understood that the other outlet ports 36, 38 can have similar or identical keyed couplings with their respective spray nozzles 14. Where the nozzle body 12 and spray nozzle 14 are plastic, the keyed components can be integrally formed therewith.

The key 112 on the spray nozzle 14 can comprise a lug 116 on the stem 70. The lug 116 can be integrally molded with the stem 70, distally of the bead 94, i.e. closer to the head 72 of the nozzle 14. The lug 116 can also be integrally molded with the flange 106, and can be extend radially from the stem 70 partially along the proximal surface 110 of the flange 106.

The keyway 114 on the outlet port 32 can comprise a slot 118 dimensioned to snugly receive the lug 116 to lock the stem 70 and the outlet port 32 together radially, thereby preventing, or substantially preventing, rotation about the stem axis 70A. Providing a single lug 116 and single slot 118 results in only one orientation in which the spray nozzle 14 can be fully inserted into the outlet port 32, assuring that cleaning media will be sprayed in a predetermined spray direction from the outlet 78.

The lug 116 must be in axial alignment with the slot 118 for full insertion of the 70 stem into the outlet port 32, i.e. where the snap-fit engages. During installation of the spray nozzle 14 on the nozzle body 12, the stem 70 can be pushed into the outlet port 32 until the lug 116 meets the rim 108. If necessary, the nozzle 14 can be rotated until the lug 116 lines up with the recess slot 118, whereupon the nozzle 14 can be pushed the remaining distance into the outlet port 32, and snapped into place.

It is understood that the spray nozzles 14 and outlet ports 32, 36, 38 may have keyed couplings that are similar or identical in structure, or that different keyed couplings may be provided. In the embodiment of the nozzle assembly 10 shown in FIGS. 1-6, the keyed couplings are substantially identical in structure. In other embodiments, the keyed couplings can be customized for each nozzle 14. In the exemplary embodiment shown, for example, forming the key 112 in a different radial position on the stem 70 than that shown in FIGS. 5-6 will result in a different predetermined axial alignment of the nozzle 14 with the nozzle body 12. By customizing the predetermined axial alignment of each nozzle 14 on the nozzle body 12, the nozzle assembly 10 can direct sprays of cleaning media toward different target areas to provide a large surface coverage with one nozzle assembly 10.

Figure 7:
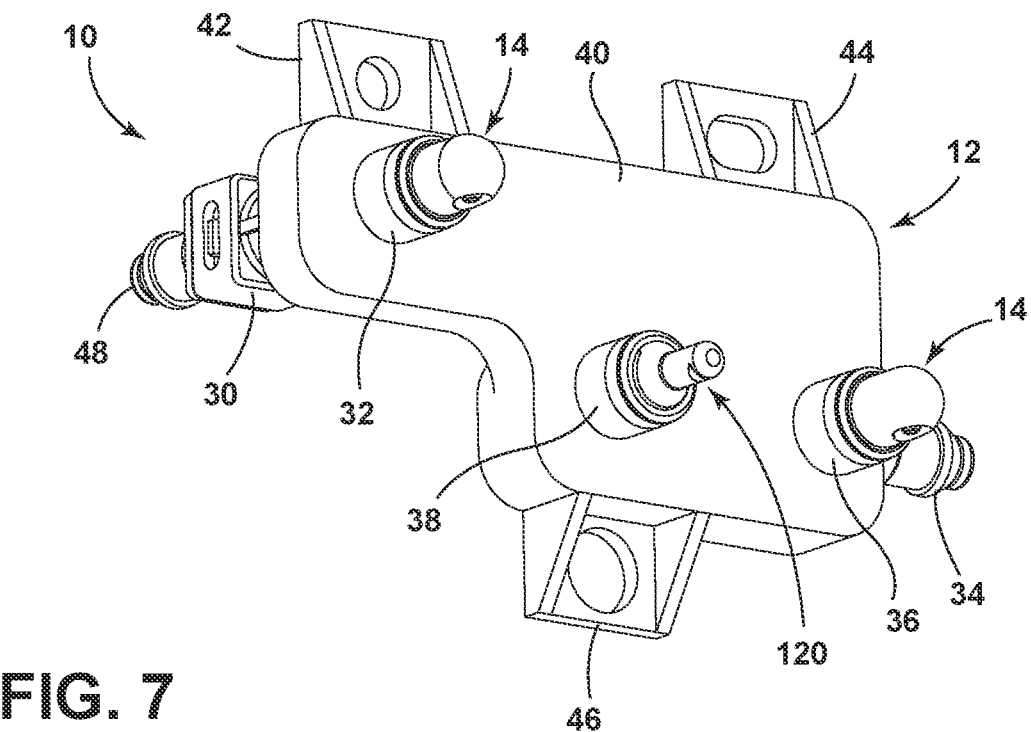
FIG. 7 is a front perspective view of a nozzle assembly according to a second embodiment of the disclosed inventive concept.

In another embodiment of the nozzle assembly 10, the spray nozzles may not all be identical. Referring to FIG. 7, the nozzle assembly 10 can include at least one spray nozzle 120 that is different from at least one other spray nozzle 14. The spray nozzle 120 is shown as being coupled to the outlet port 38, although it is understood that, in certain embodiments, the spray nozzle 120 is coupleable to any of the outlet ports 32, 36, or 38.

Figure 8:
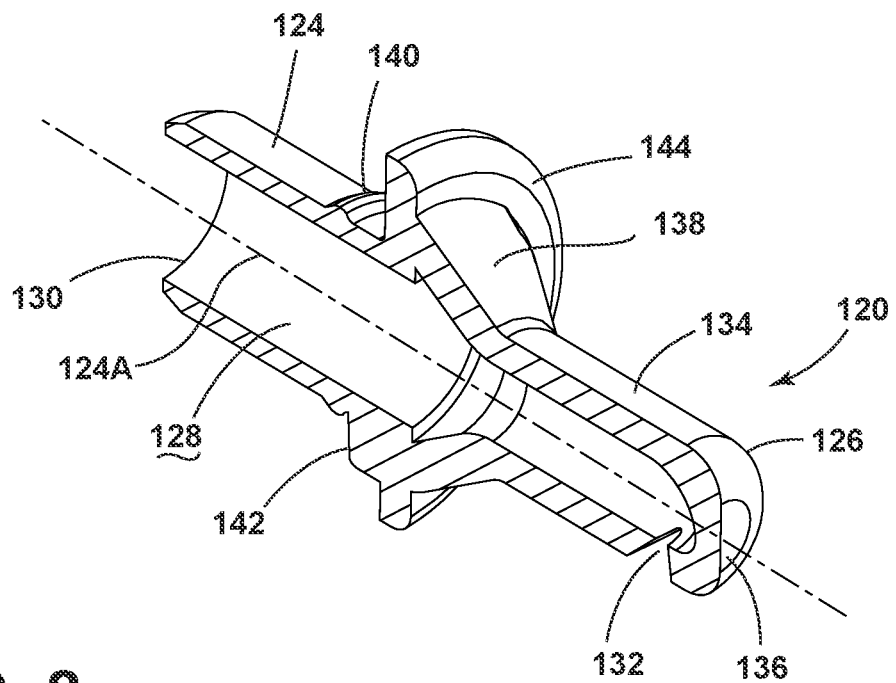
FIG. 8 is a sectional view of a spray nozzle for the nozzle assembly of FIG. 7.

FIG. 8 is a sectional view of the spray nozzle 120. The spray nozzle 120 includes a stem 124 and a head 126. A flow passage 128 extends through the stem 124 and the head 126, from a nozzle inlet 130 at the stem 124 to a nozzle outlet 132 at the head 126. The nozzle outlet 132 comprises an exit orifice through which cleaning media is sprayed. The stem 124 is receivable within one of the outlet ports 32, 36, 38 of the nozzle body 12. When installed, the head 126 can project outwardly from the nozzle body 12.

The head 126 can include a peripheral wall 134, which can be annular or tubular, as shown herein. In the illustrated embodiment, the distal end of the head 126 can be closed by a distal end wall 136. The outlet 132 can be formed through the peripheral wall 134 as shown, or through the distal end wall 136 in other embodiments of the spray nozzle 120. A proximal end 138 of the head 126 can flare outwardly in a conical shape, and is connected with the stem 124.

The stem 124 can extend along stem axis 124A, with the nozzle inlet 130 of the stem 132 being generally coaxial with the stem axis 124A. The head 126 can also be generally coaxial with the stem axis 124A, with the peripheral wall 134 elongated along the axis 124A.

For the outlet port 38 (see FIGS. 3 and 7), the stem axis 124A can be coaxial with the outlet axis 38A and perpendicular to the flow channel axis 18A. As such, the stem 124 is inserted into the outlet port 38 transverse to the flow channel axis 18A.

The outlet 132 can be any type of cleaning media outlet, suitable for the purposes described herein, including the spraying or dispensing of cleaning media to a vehicle surface. In the illustrated embodiment, the outlet 132 comprises an aperture provided in the peripheral wall 134 of the head 126, though the number and disposition of apertures can vary in other embodiments of the disclosed inventive concept. The aperture can have any shape and be provided in any form, including, but not limited to, a slot, slit, opening, etc. The outlet 132 can be configured to produce various spray patterns, i.e. a static fan spray, a static jet spray, etc.

The outlet 132 can be configured to direct a spray of cleaning media generally obliquely to the stem axis 124A. In other embodiments, the outlet 132 is configured to direct a spray of cleaning media radially to the stem axis 124A, axially along the stem axis 124A, tangentially relative to the stem axis 124A, at an angle between the radial, axial, and/or tangential directions, or in multiple directions relative to the stem axis 124A.

The spray nozzle 120 can be snap-fit and/or keyed to the outlet port 38 of the nozzle body 12, in the same or similar manner as described above with respect to nozzle 14. For example, the spray nozzle 120 can comprise a snap-lock element in the form of a bead 140 on the stem 124 and a key in form of a lug 142 on the stem 124. The base or proximal end of the nozzle head 126 can include a flange 144 that seats against the outlet port 38 when the nozzle 120 is assembled with the nozzle body 12, e.g. when the stem 124 is fully installed in the outlet port 38.

While a snap-fit mounting has been discussed thus far, in other embodiments, one or more spray nozzles 14, 120 can be connected to the nozzle body 12 via other suitable mounting or attachment configurations. Such configurations include, but are not limited to, fasteners (e.g. threaded fasteners such as bolts, screws, etc., push fasteners, clamp fasteners, etc.), quick connectors, threaded connectors/connections, male-female couplings, press-fit couplings, or welding. For a welded connection, vibration, ultrasonic, or laser welded may be used to form a welded joint between the spray nozzle 14, 120 and nozzle body 12.

FIG. 9 shows an embodiment of a vehicle 146 comprising at least one nozzle assembly 10 described with respect to FIGS. 1-3. The vehicle 146 can be a human-driven vehicle, or a self-driving or autonomous vehicle, and can comprise various vehicle surfaces, some examples of which include a front windshield 148, a rear windshield 150, a camera 152, a sensor 154, side mirrors 155, and headlights or headlamps 156. The nozzle assembly 10 can be mounted in various locations on the vehicle 146 to the clean various vehicle surfaces 148, 150, 152, 154, 155, and 156. For example, the nozzle assembly 10 can be hood mounted, under hood mounted, cowl screen mounted, or wiper arm mounted. In another example, the nozzle assembly 10 can be integrated in or mounted on a rear end spoiler or a center high-mounted stop lamp (CHMSL). It is noted that multiple nozzle assemblies 10 are schematically represented in FIG. 9, and are not necessarily drawn to scale relative to the vehicle 146 or the various vehicle surfaces. It is also noted that the number and location of the nozzle assemblies 10 for the vehicle 146 can vary from the illustrated embodiment, and it will be understood by those skilled in the art that the vehicle 146 can use different numbers of nozzle assemblies 10 and in different locations in accordance with the principles of the present disclosure. In addition, although the illustrated embodiment of the vehicle 146 includes one rear camera 152 and one front sensor 154, it will be understood by those skilled in the art that the vehicle 146 can use different numbers of cameras and sensors in various locations on the vehicle 146 in accordance with the principles of the present disclosure. Some non-limiting examples of sensors 154 include radar sensors, or LIDAR sensors providing a 360° view of the environment around the vehicle 146.

FIG. 10 shows an embodiment of a system 158 for cleaning a vehicle surface. The system 158 of FIG. 10 can be incorporated into the vehicle 146 of FIG. 9. The system 158 can include at least one fluid supply tank or reservoir 160 storing a supply of cleaning media 162, the nozzle assembly 10 applying the cleaning media 162 to the vehicle surface, and conduits 164, 166 which may include hoses, ducts, and/or other tubing, delivering the cleaning media 162 from the reservoir 160 to the nozzle assembly 10. The cleaning media 162 is put under pressure from an external system, e.g. a pump 168 or compressor (not shown).

In the illustrated embodiment, the vehicle surface is the camera 152, but can alternatively be any of the vehicle surfaces discussed herein. Cleaning media 162 from the reservoir 160 is forced through conduits 164, 166 by the pump 168 and sprayed onto the camera 152 by the nozzle assembly 10. The supply of cleaning media to the nozzle assembly 10 can be automated, with cleaning media being supplied automatically predetermined intervals or on an as-needed basis, or can be manual, such as by providing a switch (not shown) in the vehicle cabin that is manually-actuatable by a driver of the vehicle.

The cleaning system 158 can be provided with one or more fluid control valves to control the flow of cleaning media to the inlets 20, 22 of the nozzle assembly 10. As shown in FIG. 10, a first valve 170 can be provided in the flow path between the pump 168 and the first inlet 20 to control the supply of cleaning media to the first flow channel 16 (FIG. 2) and any spray nozzle 14 associated therewith. A second valve 172 can be provided in the flow path between the pump 168 and the second inlet 22 to control the supply of cleaning media to the second flow channel 18 (FIG. 3) and any spray nozzle 14 associated therewith. The valves 170, 172 can operates to open and close at the same time, alternating times, or at other times to provide a desired spray operation for the surface to be cleaned. For example, the valves 170, 172 can open at alternating times for an alternating spray operation. Other valve-timing cycles are possible.

The cleaning system 158 can optionally include a heating element (not shown) heating the cleaning media before it is applied to the vehicle surface, and additional conduits, ducts, tubing, hoses, fluid connectors, and/or manifolds (not shown) fluidly coupling components of the system 158 together and providing a fluid flow path from the reservoir 136 to each inlet of the nozzle assembly 10. Additionally, the system 158 can comprise more than one reservoir and/or more than one pump.

FIG. 11 shows another embodiment of a system 158 for cleaning a vehicle surface. The system 158 of FIG. 11 can be incorporated into the vehicle 146 of FIG. 9. The system 158 can include multiple fluid supply tanks or reservoirs, including a first reservoir 160A and a second reservoir 160B. Each inlet 20, 22 of the nozzle assembly 10 is supplied by a different reservoir. The system 158 can further include a first pump 168A controlling the flow of cleaning media 162A from the first reservoir 160A to the first inlet 22 of the nozzle assembly 10 and a second pump 168B controlling the flow of cleaning media 162B from the second reservoir 160B to the second inlet 22 of the nozzle assembly 10.

In this system, valves 170, 172 can control the flow of cleaning media to the inlets 20, 22 of the nozzle assembly 10. Alternatively, the valves 170, 172 can be eliminated, and the pumps 168A, 168B can be operated to provide a desired spray operation for the surface to be cleaned.

It is noted that while FIGS. 10 and 11 show the nozzle assembly 10 directed sprays of cleaning media from all nozzles 14 toward one vehicle surface, in other embodiments, one or more of the nozzle can be directed toward a different target area of the vehicle surface to provide a large surface coverage with one nozzle assembly 10. In yet other embodiments, the nozzles 14 can be directed toward different vehicle surfaces altogether to clean multiple vehicle surfaces with one nozzle assembly 10.

As used herein, the term "cleaning media" encompasses fluid substances that are capable of flowing, including liquid, air, and mixtures thereof. The term "air" encompasses air and any other gas or mixtures of gasses, unless otherwise noted.

The term "proximal" as used herein refers to that end or portion which is situated toward the point of origin of fluid flow, i.e. toward the source of cleaning media and away from the outlets 78, 132 of spray nozzles 14, 120. The term "distal" as used herein refers to that end or portion which is situated away from the point of origin of fluid flow, i.e. toward the outlets 78, 132 in the case of spray nozzles 14, 120 and away from the source of cleaning media The terms "connected" or "connect" are used herein in their broadest sense to mean and encompass the notions of being mounted or attached to, formed or integrated with, or otherwise joined.

Directional terms, such as "vertical," "horizontal," "top," "bottom," "upper," "lower," "inner," "inwardly," "outer" and "outwardly," are used to assist in describing the disclosed inventive concept based on the orientation of the embodiments shown in the illustrations. The use of directional terms should not be interpreted to limit the disclosed inventive concept to any specific orientations.

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

It is to be understood that the appended claims are not limited to express and particular apparatus or methods described in the detailed description, which may vary between particular embodiments that fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology that has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A nozzle assembly for a vehicle washing system comprising:
    a unitary nozzle body comprising a one-piece molded article including a central body, a plurality of inlet ports integrally formed with the central body, a plurality of outlet ports integrally formed with the central body, and a plurality of flow channels extending through the central body that are fluidly isolated from each other, the plurality of flow channels each comprising one of the plurality of inlet ports and at least one of the plurality of outlet ports;
    a plurality of spray nozzles, each of the plurality of spray nozzles attachable to one of the outlet ports via a snap-fit connection;
    the plurality of spray nozzles including a first spray nozzle comprising:
        a nozzle housing having a stem received within a first outlet port of the plurality of outlet ports and a head projecting outwardly from the nozzle body, the head comprising a nozzle outlet through which cleaning media is sprayed; and
        a flow passage extending through the stem and the head of the nozzle housing;
    wherein the snap-fit connection between the first spray nozzle and the first outlet port comprises:
        a snap-lock receiver integrally formed on one of the first outlet port and the stem; and
        a snap-lock element integrally formed on the other one of the first outlet port and the stem, the snap-lock element engageable with the snap-lock receiver to retain the first spray nozzle in a mounted position on the nozzle body;
    wherein the head comprises a flange seated against a rim of the first outlet port, with a proximal surface of the flange in flush engagement with the rim;
    wherein the first spray nozzle comprises:
        an accommodation space in the head; and
        a jet insert having a spherical body inserted into the accommodation space, the spherical body including a bore extending therethrough, with the nozzle outlet at an outward end of the bore and an entry opening at an inward end of the bore, the entry opening open to the flow passage.

2. The nozzle assembly of claim 1, wherein:
    the plurality of flow channels comprises a first flow channel and a second flow channel, a portion of the first flow channel extending along a first axis, and a portion of the second flow channel extending along a second axis; and
    the second axis is non-parallel to the first axis.

3. The nozzle assembly of claim 2, wherein the first and second axes are perpendicular to each other.

4. The nozzle assembly of claim 2, wherein the stem of the first spray nozzle comprises a stem axis that is collinear with the first axis and one of perpendicular and oblique to the second axis.

5. The nozzle assembly of claim 2, wherein the nozzle outlet has a nozzle outlet axis that is oblique to the first axis.

6. The nozzle assembly of claim 1, comprising
    a check valve integrated with the nozzle body to control the flow of cleaning media to the first spray nozzle.

7. The nozzle assembly of claim 1, wherein:
    the snap-lock receiver comprises a groove in an inner surface of the first outlet port; and
    the snap-lock element comprises a bead on an outer surface of the stem, the bead at least partially received by the groove.

8. The nozzle assembly of claim 7, comprising:
    a keyway on the first outlet port; and
    a key on the stem, the key receivable in the keyway to align the stem in a predetermined position on the first outlet port and lock the first spray nozzle and the nozzle body together radially.

9. The nozzle assembly of claim 8, wherein the key comprises a lug on the stem, the lug disposed between the head of the nozzle housing and the bead, wherein the head comprises a flange seated against a rim of the first outlet port with a proximal surface of the flange in flush engagement with the rim, and wherein the lug extends radially from the stem along the proximal surface of the flange.

10. The nozzle assembly of claim 1, comprising:
    a keyway on one of the first outlet port and the stem; and
    a key on the other one of the first outlet port and the stem, the key receivable in the keyway to align the stem in a predetermined position on the first outlet port and lock the first spray nozzle and the nozzle body together radially.

* * * * *